United States Patent

[11] 3,616,326

[72] Inventor Edward I. Onstott
 Los Alamos, N. Mex.
[21] Appl. No. 868,440
[22] Filed Oct. 22, 1969
[45] Patented Oct. 26, 1971
[73] Assignee The United States of America as represented by the United States Atomic Energy Commission

[54] SEPARATION OF RARE EARTHS BY ELECTROLYSIS WITH POROUS CARBON ELECTRODES
 2 Claims, 1 Drawing Fig.
[52] U.S. Cl. .................................................. 204/93, 204/180 R
[51] Int. Cl. ................................................ C01b 17/96
[50] Field of Search .......................................... 204/93, 180

[56] References Cited
UNITED STATES PATENTS

| | | | |
|---|---|---|---|
| 2,273,798 | 2/1942 | Heise et al. .................... | 204/82 |
| 3,124,520 | 3/1964 | Juda ............................ | 204/86 |
| 3,347,761 | 10/1967 | Bicek ........................... | 204/151 |

Primary Examiner—John H. Mack
Assistant Examiner—A. C. Prescott
Attorney—Roland A. Anderson ABSTRACT: A method of separating europium from trivalent rare earth elements by passing an electrolyte containing a mixture of such elements between porous carbon electrodes at a cell potential of 2 to 2.5 volts. As the mixture of cations passes through the porous cathode, Eu(III) is selectively reduced to Eu(II) which can then be precipitated as $EuSO_4$.

PATENTED OCT 26 1971
3,616,326
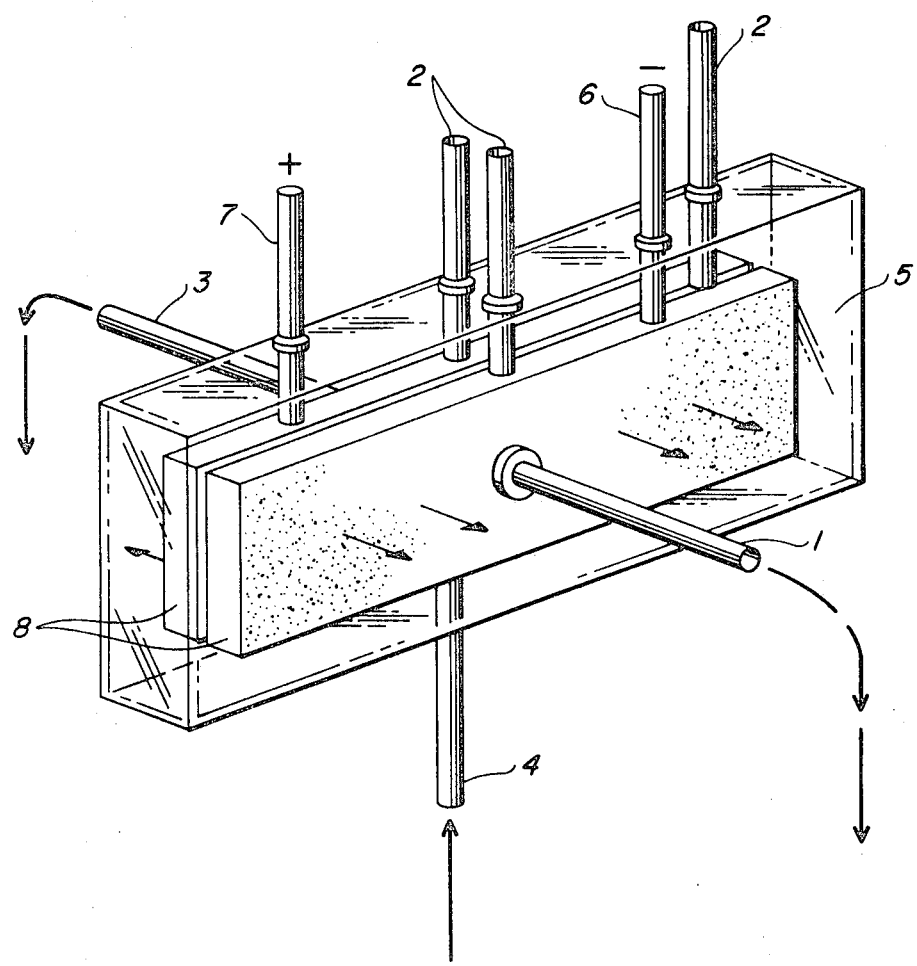
INVENTOR.
Edward I. Onstott
BY

SEPARATION OF RARE EARTHS BY ELECTROLYSIS WITH POROUS CARBON ELECTRODES

The invention described herein was made in the course of, or under, a contract with the U.S. Atomic Energy Commission.

It is well known that europium may be separated from a mixture of trivalent lanthanons (elements with atomic numbers 57 to 71, commonly known as the rare earth elements) by taking advantage of the different character of the Eu(II) oxidation state. The reduction may be brought about by contacting a solution of trivalent lanthanons with zinc amalgam. In the presence of sulfate ions, insoluble $EuSO_4$ precipitates if the europium concentration is greater than several grams per liter. If the europium concentration is less than this, barium may be added as a carrier, in which case $BaSO_4$ and $EuSO_4$ coprecipitate.

A disadvantage of this method of separation is that some trivalent lanthanons carry along, and it may be necessary to reoxidize the europium and repeat the process several times to achieve a europium concentration over 50 percent. A further disadvantage is that the europium picks up some zinc as an impurity.

Although electrochemical methods have been used for the separation of europium from other lanthanons, they have heretofore been limited mostly to mercury and amalgam electrodes. However, such electrodes require phase transfer of the europium to the electrode material. In addition, electrolysis with such electrodes is essentially a batch process rather than a continuous flow process.

It is therefore an object of this invention to provide a method for electrolytically separating europium from a mixture of trivalent lanthanons. A further object is to accomplish such separation mechanically without electrolytic phase transfer. Still another object is to accomplish such separation from a continuously flowing electrolyte.

The FIGURE is a plan view of the cell used in the present invention. Shown are the electrodes 8 which are made of carbon that has a high porosity and high electrical conductivity. The size of the electrodes is approximately 0.2×5×10 centimeters, and the spacing between said electrodes is approximately 4 millimeters. Electrical connections 6 and 7 are press-fitted to each electrode. These electrical connectors are made of a 0.64 centimeter diameter graphite rod. Polyethylene inlet 4 and outlet tubes 1 and 3 are attached to the acrylic plastic cell 5 with an epoxy resin. The collection chambers between the backside of each electrode and the exterior wall 5 are about 0.1×5×10 centimeters in size. Attached to the top of the cell are gas vents 2 that prevent the buildup of gas between the electrodes and in the collection chambers.

When current is passed between inert electrodes in an aqueous electrolyte, there is a migration of positive ions from the anode region to the cathode region of the cell. If the cathode is porous, the cations may be separated from anode electrolysis products by simply flowing the electrolyte through the porous electrodes. No phase transfer is necessary. If the feed electrolyte consists of a mixture of trivalent lanthanon chlorides with some bromides also present, and the cell potential is maintained at 2 to 2.5 volts, europium in the catholyte (that part of the electrolyte containing the cathode electrolysis product) is selectively reduced to the divalent state. As noted earlier, it can then be precipitated as $EuSO_4$ by the addition of sulfate to the catholyte. The other lanthanons, being still in the trivalent state, are not precipitated.

A major source of rare earths is bastnasite, a rare earth fluorocarbonate. The ore, after crushing and grinding, is upgraded to about 60 percent $Ln_2O_3$ which may be further upgraded by leaching with HCl to about 70 percent. Typical lanthanon content is: $CeO_2$, 50%; $La_2O_3$, 32%; $Pr_6O_{11}$, 4%; $Nd_2O_3$, 13%; $Sm_2O_3$, 0.5%; $Eu_2O_3$, 0.1%; $Gd_2O_3$, 0.2%; and other $Ln_2O_3$, 0.2% (see, e.g., Kirk-Othmer Encyclopedia of Chemical Technology, Vol. 17, pp. 146–147 (1968)). These lanthanon oxides can readily be converted to soluble chlorides.

In the following embodiment of the present invention, europium is recovered from a mixture of rare earths simulating the approximate composition of oxide from bastnasite. Pure rare earths were mixed in the following proportions: La, 60 parts; Pr, 8 parts; Nd, 28 parts; Sm, 2 parts; Gd, 1 part; and Eu, 0.1 part. Electrolyte was made by mixing $LaBr_3$ and $SmBr_3$ with chlorides of the other rare earths and adjusting the pH to a value of 4.7. There were 33 grams of rare earth oxide per liter of electrolyte. $BaCl_2 \cdot 2H_2O$ in the amount of 2.5 grams per liter of electrolyte was added. An electrolysis was done at 2.4 volts and 170 milliamperes current. The electrodes had an effective area of 40 $cm.^2$ each. Anolyte flow was 7 ml./min. and catholyte flow was 20 ml./min. Oxygen contamination was suppressed with helium purge gas. $BaSO_4$ and $EuSO_4$ were coprecipitated immediately after electrolysis by addition of $(NH_4)_2SO_4$ to the catholyte. The amount of europium in the precipitate was 58 percent of that which was present in the catholyte before precipitation.

When the concentration of rare earths (including europium) in the feed electrolyte was reduced by a factor of four, the yield of europium in the precipitate was 32 percent of that present in the catholyte prior to precipitation.

It appears that when the number of rare earths present in the feed electrolyte is reduced and the europium content is higher, the yield of europium becomes higher. With an electrolyte consisting of a mixture of 0.02M $EuBr_3$ and 0.02M $GdCl_3$, the reduction of Eu(III) to Eu(II) is almost quantitative.

Nongas-forming anodic depolarizers are required to maintain the proper cell potential. Bromide salts or hydrobromic acid are most effective for this purpose.

With the addition of barium to the electrolyte to act as a carrier, it is apparent that europium concentrations as small as a few hundredths of a percent can readily be recovered from mixtures of the rare earths. The only upper limit on the concentration of europium that can be recovered from such a mixture appears to be the capacity of the electrolyte itself to contain the europium.

Europium at an initial concentration of about 0.2 grams per liter may be concentrated to about 15–20 grams per liter by solvent extraction from an acidic solution of rare earth chlorides using di(2-ethylhexyl) phosphoric acid diluted with kerosene. A standard procedure for obtaining the europium then calls for contacting this solution with zinc amalgam (as earlier described). It appears that the electrolytic process for the separation of europium herein disclosed may advantageously replace the zinc amalgam procedure for recovery of europium.

What I claim is:

1. A method of separating europium from a mixture of trivalent rare earth elements, comprising passing an electrolyte containing a mixture of such elements through porous inert electrodes, maintaining said electrodes at a potential between 2 and 2.5 volts, selectively reducing Eu(III) to Eu(II), and precipitating the Eu(II) as $EuSO_4$.

2. The method of claim 1 in which the electrodes are composed of carbon and either hydrobromic acid or bromide salts are added to maintain the proper cell potential.

* * * * *